United States Patent [19]

Pirello

[11] Patent Number: 4,701,332

[45] Date of Patent: Oct. 20, 1987

[54] PROCESS FOR PREPARING A TOFU CHEESE AND PRODUCT

[76] Inventor: Robert J. Pirello, 932 Pine St., Philadelphia, Pa. 19107

[21] Appl. No.: 798,566

[22] Filed: Nov. 15, 1985

[51] Int. Cl.$^4$ ............................................. A23C 20/02
[52] U.S. Cl. ................... 426/302; 426/570; 426/582; 426/656
[58] Field of Search ................ 426/46, 302, 582, 570, 426/634, 656

[56] References Cited

U.S. PATENT DOCUMENTS

| | | | |
|---|---|---|---|
| 3,743,516 | 7/1973 | Lundstedt et al. | 426/582 X |
| 3,944,676 | 3/1976 | Fridman et al. | 426/582 X |
| 3,982,025 | 9/1976 | Hashimoto et al. | 426/634 X |
| 4,144,358 | 3/1979 | Kudo et al. | 426/582 |
| 4,579,749 | 4/1986 | Ishizuka et al. | 426/634 X |

FOREIGN PATENT DOCUMENTS

| | | | |
|---|---|---|---|
| 3401342 | 7/1985 | Fed. Rep. of Germany | 426/582 |
| 0006840 | 4/1984 | Japan | 426/582 |
| 0071642 | 4/1984 | Japan | 426/582 |

*Primary Examiner*—Robert Yoncoskie
*Attorney, Agent, or Firm*—Dilworth, Paxson, Kalish & Kauffman

[57] ABSTRACT

A novel whipped low fat and low cholesterol water separation resistant tofu cheese spread with a substantially soft creamy texture is described. A method of manufacturing a tofu cheese is disclosed from a firm relatively non-porous tofu brick by coating the brick with a thin mellow white miso coating, aging the coated brick, scraping miso from said brick and soaking the brick in water until the salt content of the brick reaches equalibrium with the water and thereafter whipping such brick to form a creamy texture.

14 Claims, No Drawings

PROCESS FOR PREPARING A TOFU CHEESE AND PRODUCT

BACKGROUND OF THE INVENTION

1. Field of the Invention

The present invention relates to a tart soft creamy water separation resistant tofu product and to a method of manufacturing same.

2. Information Disclosure and Summary of the Present Invention

While a soy bean curd called tofu has been well known for some time, it is believed that prior to the present invention there has been no natural, organic tofu product resistant to water separation and yet having a tart soft creamy texture.

In recent years, soy bean curd has been recognized as a high quality protein which has been disclosed as useful, for example, for making seasonings or prepared foods including spreads and the like. The prior art appears to be directed to special processes and agents used in the formation of the actual tofu from soy beans and more particularly to the manner of obtaining and treating the curd during the initial formation of the tofu.

In U.S. Pat. No. 4,460,613 a soy based cheese food is described in which the soy protein slurry, after heating to a temperature of at least about 200° F., is retained under positive pressure following which the slurry is cooled and mixed with an edible oil to improve whiteness of the products.

In U.S. Pat. No. 4,537,789 the rate of rise of temperature at the center of a raw material for tofu is adjusted to within a specific range together with the pressure to obtain a tofu which is purported to be smooth and have a compact texture free from pores and syneresis.

In U.S. Pat. No. 4,511,588 a preservable granular particulate tofu which is smooth and does not liberate water during storage is prepared by coagulating soy bean milk or soy bean protein paste in heated oil at specified temperatures at higher soy bean milk concentrations than are conventionally used in ordinary tofu; the pH of the paste is elevated and egg white is added to coagulate the soy bean milk.

In U.S. Pat. No. 4,303,678 a long shelf life packaged soy bean curd is disclosed as being produced without the inclusion of any artificial additives such as coagulating agents and the like wherein soy bean juice is subjected to lactic acid fermentation until it reaches a specified pH whereupon the soy bean juice is subjected to heating to adjust the curd tension.

One of the many advantages of the present invention is that a novel tofu product can be manufactured using basically a standard tofu product by adopting the novel processing steps subsequent to the formation of the curd from the soy bean slurry without requiring or utilizing various additives, pressurized systems, heated oils or the like.

It is an object of the present invention to produce a novel tofu cheese product having major health benefits including the production of a product which is natural and organic, does not require any additives and yet has a novel creamy (rather than grainy) consistency while retaining beneficial characteristics such as low fat, low sodium, and virtually no cholesterol.

Another object of the present invention is to produce a cream cheese substitute having the aforementioned attributes, further characterized in that it has a novel tart taste which is similar to that of boursin cheese and has a unique texture which makes the product a novel entry into the natural/health foods market place.

Yet another object of the present invention is to create such a unique product while utilizing a generally standard recipe for the initial processing of tofu from soy beans and then treating same using natural means without resorting to expensive and/or complicated processes and/or systems.

Still yet a further object of the present invention is to produce a relatively non-porous integral tofu brick by virtue of control of moisture content and by incorporating novel tofu pressing and cooling techniques.

Yet another object of the present invention is to treat the firm integral tofu brick by coating same with a natural miso coating and then naturally aging the brick to produce a smooth and compact texture which is relatively free from pores and syneresis.

Yet a further object of the present invention is to treat the aged brick in a manner which produces a soft creamy textured low salt tofu product.

Other objects will be understood by those skilled in the art upon reading the specification herein including the detailed description of the preferred embodiment and the claims.

DETAILED DESCRIPTION OF THE PREFERRED EMBODIMENT

In producing the novel product of the present invention it is preferred that organically grown soy beans be stored and transported under controlled conditions at for example 35° F. The soy beans are cooked as is known in the art in open kettles where the whey is separated from the curd which is then pressed using, for example, a ratchet tofu press as is known in the art.

The present invention however requires the formation of a firm tofu brick and whereas a standard tofu brick may be formed using a ratchet tofu press by pressing same for from 15 to 30 minutes, the firm brick utilized in the present invention generally requires from about 60 to 90 minutes. It is believed, that in forming the firm brick for use in the present invention that the moisture content of the tofu brick is reduced.

In the preferred embodiment the curd or tofu is removed from the cooked soy bean slurry and then pressed as above mentioned and then cooled in a controlled fresh water bath of constantly flowing filtered water. Preferably the water is controlled at a temperature of no more than about 40° F. and more preferably and possibly critically at a temperature of no more than about 35° F. or below, provided however the pressed tofu bricks are not cooled to a point where they begin to freeze. Desirably the subject bricks are treated in such a manner for at least about 72 hours, and more preferably are soaked in such a cooling fresh water bath for between about 80 and 110 hours. The determination of the length of time for the bath is believed in part dependent upon circulation, water temperature, and the like, and the mentioned time periods are set only insofar as required to produce the desired final product. It has been found that the resultant brick from the ratchet tofu pressing operation will become even more dense in the controlled fresh water bath which is believed to be critical to the formation of the smooth and compact texture of the resultant bathed brick which in turn is believed critical to the formation of the creamy textured whipped tofu product.

After being treated in the controlled fresh water bath the tofu bricks are generally kept under refrigerated conditions of, for example, 35° F. or thereabouts and maintained in buckets of water. It is believed that tofu bricks so packaged can be kept for a period up to and including 10 days. In the preferred embodiment the tofu bricks are removed from the temperature controlled water filled receptacles as soon as further processing is feasible and placed on, for example, towels or the like to remove the surface water from the bricks. Thereafter, the bricks are then coated with a very thin coating of mellow white miso, which is a short term fermented soy paste as is known in the art. The bricks are preferably uniformly coated with a thin pie crust like coating which substantially completely covers the bricks and may be about one-eighth of an inch thick. It has been found that thicker coatings create a saltier product and therefore the coating thickness may be adjusted as would be appropriate to produce the desired product.

The coated tofu bricks are then wrapped in cheese cloth and aged. The large salt content of the miso extracts water from the tofu while some of the salt from the miso coating migrates into the tofu. The interaction is also believed to be in part responsible for the transformation of the normally grainy tofu texture into a substantially smooth creamier texture.

It is important that the aging process take place in environmentally controlled conditions of controlled temperature and relative humidity and it has been found, for example, that in relatively cooler temperatures with low relative humidity that the aging process takes longer than under higher temperature and humidity conditions generally prevalent, for example, in the summer. It is important that a balance be struck in the aging process between the length of time in which the tofu is aged and the resultant increase in salt content caused by the migration of the salt from the miso into the brick. It has been found that as conditions vary the length of time required for the aging process varies from about 2 to 7 days. To obtain the appropriate aging within such time period (2 to 7 days) desirably the temperature in degrees Fahrenheit and relative humidity in percent are controlled such that the sum of the two variables lies within the range of between about 100 to 175. Under controlled conditions of 72° F. and 50% relative humidity, miso coated tofu bricks of the present invention were properly aged in as little as 2 days, although relatively higher temperatures under conditions of relatively low to moderate relative humidity yield similar results.

After the aging process, the miso coating should be a somewhat dry crusty coating which can be scraped off by hand leaving at most a residue of the miso on the tofu brick. Preferably, the brick is then quartered and soaked in a cooling water bath which tends to adjust the salt level in the brick. The 8" by 8" by 2" tofu bricks were quartered and were bathed in fresh filtered water at 35° F. with about 6.25 bricks to a five-gallon container of water. It was found that the optimal equilibrium conditions of salt in the tofu brick were reached in 35° F. water whereas warmer water tended to maintain a higher than desirable salt content in the brick. In the above mentioned example, the brick quarters were bathed for up to about 15 minutes and then removed from the water. It was found that longer times generally did not drastically change the percentage of salt in the tofu brick however tended to result in a product which became too bland in taste. Shorter times resulted in a brick which was too salty.

Upon removal from the water bath, the tofu brick quarters were placed on towels to remove the surface moisture and thereafter placed in a 40 quart food processer and whipped for approximately 45 to 60 seconds which produced a soft creamy textured spread which could thereafter be packaged. In whipping the tofu bricks, care must be taken to substantially keep intact what is believed to be the protein molecule which insures the production and maintenance of the creamy texture while retaining the water separation resistant characteristics. It was found that by whipping the tofu bricks for too long a period of time or at too high a shear rate would in fact cause water separation in the whipped product, which is undesirable. It is believed preferable to maintain the whipped product under controlled conditions of about 35° F., lower temperatures may be acceptable provided the whipped tofu product does not begin to freeze.

It is believed that the organically grown soy beans kept under controlled refrigerated conditions and processed as described hereinbefore produce a fresher bean. This may also contribute to the less "grainy", substantially creamy texture of the tofu of the present invention. The aforementioned process produces a whipped tofu product comprising a low fat and low cholesterol soft creamy water separation resistant tofu spread having a substantially creamy, cream cheese like texture and a tart, boursin like taste.

While the invention has hereinbefore been described with reference to a preferred embodiment, it should be understood that further modifications or variations may be made by those skilled in the art without departing from the spirit and scope of the invention including that which is defined by the appended claims. Moreover, it should be noted that while various parameters and mechanical and chemical reactions are stated as being believed to produce the desired end result, it may be possible to obtain a creamy textured product by using variations of the preferred parameters as hereinbefore set forth.

What is claimed is:

1. A process for the preparation of a creamy tofu cheese from a tofu brick comprising coating said brick with a mellow white miso coating, aging said coated brick for a time sufficient to produce a smooth and compact texture which is relatively free from pores and syneresis, scraping said miso from said brick, soaking said brick in fresh water until the salt content of said brick remains substantially unchanged, and whipping said brick until a creamy texture is achieved, whereby a soft creamy water separation resistance tofu cheese is formed.

2. A process as in claim 1, wherein said aging step comprises maintaining said coated bricks in a controlled environment wherein the sum of the temperature (°F.) and relative humidity (%) is within the range of from about 100 to 175.

3. A process as in claim 2, wherein said aging process is carried out from between about 2 to 7 days.

4. A process as in claim 2, wherein said scraped tofu brick is soaked in water at a temperature below about 40° F.

5. A process as in claim 4, wherein said scraped tofu brick is soaked for no more than about 15 minutes in water at a temperature of no more than about 35° F.

6. A process as in claim 1, firm further comprising the step of soaking said tofu brick prior to coating in a controlled fresh water bath at a temperature of no more than about 35° F. whereby said density of said brick is increased.

7. A process as in claim 1, wherein said tofu brick prior to coating is soaked in a cooling fresh water bath at a temperature of no more than about 35° F. for at least about 72 hours.

8. A process as in claim 7, wherein said brick is soaked in said cooling fresh water bath for between about 80 and 110 hours.

9. A process as in claim 7, wherein the surface water from said resultant brick is removed prior to said miso coating step.

10. The product of the process of claim 1.

11. The product of the process of claim 2.

12. The product of the process of claim 4.

13. The product of the process of claim 8.

14. A process for the preparation of a soft creamy soy water separation resistant tofu cheese from soy bean curd comprising:

pressing said soy bean curd into a firm brick;

soaking said brick in a cooling fresh water bath at a temperature of no more than about 35° F. for about 80 to 100 hours;

removing the surface water from said brick; coating said brick with a mellow white miso comprising short term fermented soy paste to form a coated brick;

aging said coated brick in a controlled environment for about 1 to 7 days under conditions of temperature (°F.) and relative humidity (%) whereby their sum is between from about 100 to 175;

substantially removing said miso from said coated brick to form an aged tofu brick;

soaking said aged tofu brick in a fresh water bath until there is substantially no more change in the salt content of said aged tofu brick;

removing the surface water from said aged tofu brick to form a final brick; and whipping said final brick into a soft creamy cheese textured product.

* * * * *